United States Patent
Jurthe

(10) Patent No.: US 7,150,157 B2
(45) Date of Patent: Dec. 19, 2006

(54) METHOD FOR OPERATING AN AIR CONDITIONER, AND AIR CONDITIONER FOR A MEANS OF TRANSPORT

(75) Inventor: Stefan Jurthe, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/358,066

(22) Filed: Feb. 22, 2006

(65) Prior Publication Data

US 2006/0137365 A1 Jun. 29, 2006

Related U.S. Application Data

(63) Continuation of application No. PCT/EP04/09094, filed on Aug. 13, 2004.

(30) Foreign Application Priority Data

Aug. 23, 2003 (DE) ................. 103 38 790

(51) Int. Cl.
*F25B 49/00* (2006.01)
*F25B 29/00* (2006.01)
*B60H 1/32* (2006.01)
*G05B 13/00* (2006.01)

(52) U.S. Cl. ............... 62/132; 62/161; 62/244; 236/49.3; 165/202; 700/276

(58) Field of Classification Search ............ 62/132, 62/161, 244; 165/202; 236/49.3, 78 D; 700/276
See application file for complete search history.

(56) References Cited

U.S. PATENT DOCUMENTS

| 6,488,213 B1 * | 12/2002 | Ohga et al. | 236/49.3 |
| 6,529,782 B1 * | 3/2003 | Danz et al. | 700/34 |
| 6,644,558 B1 * | 11/2003 | Ohga et al. | 236/49.3 |
| 6,669,101 B1 * | 12/2003 | Ichishi et al. | 236/49.3 |
| 7,076,359 B1 * | 7/2006 | Lang et al. | 701/102 |
| 2003/0051491 A1 | 3/2003 | Yuichi et al. | |
| 2005/0077037 A1 * | 4/2005 | Pham et al. | 165/202 |

FOREIGN PATENT DOCUMENTS

| DE | 44 26 732 A1 | 2/1995 |
| DE | 102 52 358 A1 | 5/2003 |
| EP | 1 024 040 A2 | 8/2000 |
| EP | 1 262 346 A2 | 12/2002 |

* cited by examiner

*Primary Examiner*—Marc Norman
(74) *Attorney, Agent, or Firm*—Crowell & Moring LLP

(57) ABSTRACT

A method for operating an air conditioning system that is operable both manually and automatically for a transportation means and an air conditioning system for implementing the method are provided. An automatic characteristic line is corrected based on a manual operation. The air conditioning system includes sensors for detecting parameter values that influence and represent the climate in the transportation means, memory means having a plurality of automatic characteristic lines for different operating states which represent the fixedly predetermined dependencies between the detected sensor signals of an operating state and the assigned manipulated variables for components of the air conditioning system during automatic operation, and equipment for manual adjustment of manipulated variables.

19 Claims, 3 Drawing Sheets

METHOD FOR OPERATING AN AIR CONDITIONER, AND AIR CONDITIONER FOR A MEANS OF TRANSPORT

The present application is a continuation of International Application No. PCT/EP2004/009094, filed Aug. 13, 2004, and claims priority under 35 U.S.C. § 119 to German Patent Application No. 103 38 790.0, filed Aug. 23, 2003. The entire disclosures of the aforementioned documents are herein expressly incorporated by reference.

BACKGROUND AND SUMMARY OF THE INVENTION

The present invention relates to a method for operating an air conditioning system for a transportation means and an air conditioning system for transportation means, in particular a motor vehicle.

With today's air conditioning systems in motor vehicles, an automatic setting of an air conditioning system component, which functions as a final controlling element, e.g., the fan or the air distribution slats, is automatically adjusted from a combination (e.g., in the form of addition) of partial settings which are derived from certain operating states. Operating states include not only ambient conditions such as sunlight, temperature (inside, outside), atmospheric humidity (inside, outside) or brightness, but also such other characteristics such as the amount of heat contained in the vehicle, calculated on the basis of models.

The automatic characteristic lines of known air conditioning systems are determined and coordinated by experts with the goal of satisfying the largest possible portion of users. In determining the automatic characteristic lines, the acoustics (e.g., due to the fan) and the speed with which the heating or cooling system is automatically regulated are also important in addition to subjective well-being in the climate. This so-called 80% adjustment achieved through the use of expert characteristic lines is not optimal for all users in all operating states. By manual intervention, the user can individually adjust the automatic settings in manual mode. In doing so, the user automatically deactivates the automatic mode. If the operating states happen to change (e.g., due to a change in weather or due to the driving time after a cold vehicle start), this individual setting, adjusted manually, can be very inappropriate, so the user would again be more satisfied with the automatic setting. However, the automatic setting has the problem described previously not being individually adjusted to user's perception of comfort (80% adjustment). The user would thus have to make appropriate adjustments again through manual settings.

German Patent DE 44 26 732 A1 describes an air conditioning system having sensors for detecting parameters that represent or influence climate, memory means for storing automatic characteristic lines which describe the fixed relationships between the sensor signals detected and the manipulated variables assigned to them for components of the air conditioning system in automatic operation, and devices for manually adjusting and storing the manipulated variables. In this air conditioning system, individual operation according to the wishes of the specific user can be set by manual setting and storage of the manipulated variables and the ambient conditions defined by the ambient parameters. This individual operation may be superimposed on the fixedly predetermined automatic operation as needed and if appropriate ambient conditions prevail, this mode may be initiated automatically and turned off by manual changes by the user or by switching to fixed automatic operation.

German Patent DE 102 52 358 A1 describes an automotive air conditioning system for automatic control of a volume of circulating air to be blown into a vehicle compartment in which the automatic characteristic line of the blowing air quantity is corrected based on a manual operation. In doing so, the automatic characteristic line that is to be corrected is corrected with each manual intervention such that a portion of the characteristic line is modified by determining a new linearized linear segment of the characteristic line. However, this makes it possible to take into account the wishes of the user only to a limited extent.

The object of the present invention is to create an alternative air conditioning system and a method for controlling an air conditioning system so that individual user needs can be taken into account better.

According to this invention, any manual adjusting operation by the user is recorded during operation of an air conditioning system, preferably during automatic operation, and a learning value is determined by means of which at least one selected automatic characteristic line is modified (corrected) as a function of this change (deviation in the manually set manipulated variables from the assigned manipulated variables of the automatic mode prevailing at the time of the change—i.e., when the operating state values are the same). The learning value is determined by weighting the deviation of the manipulated variable between a control variable generated on the basis of the manual adjusting operation and the particular assigned manipulated variable of automatic operation with the same operating state values, and weighting each learning value over a range of several interpolation points with the help of a weighting function and correcting the automatic characteristic line to be corrected at each of the interpolation points with that part of the weighted learning value that is to be assigned to the particular interpolation point. The weighting function can be designed in the manner of a normal function so that learning is greatest at the active interpolation functions in each case and learning is always weaker or even nonexistent at the more supporting sites according to the distribution function. Other forms of a characteristic curve such as a triangular function having a rising and falling flank with a maximum value in between may also be employed.

The modification of the automatic characteristic line is preferably performed only after repeated manual changes during operation of the air conditioning system with at least almost the same operating state values (such as air temperature (inside; outside), atmospheric humidity (inside, outside), amount of sunlight, etc.). In this way, a plurality of pairs of manipulated variables will be determined over a lengthy operating time of the air conditioning system, optionally even over several trips with the air conditioning system in operation. The pairs of manipulated variables, comprising the manipulated variables set manually and the manipulated variables for automatic operation of the air conditioning system, can be assigned to the same operating state values and an average can be formed in each case.

To obtain as many modified manipulated variables as possible over the shortest possible period of time, they may be acquired during automatic operation and also during manual operation of the air conditioning system and may be used for a change in the automatic characteristic line(s). Using these empirical values (from acquisition and averaging of the manipulated variables) over a lengthy operating time of the air conditioning system, avoids excessively hasty learning with great fluctuations during automatic operation of the air conditioning system.

In another embodiment of the present invention, a plurality of characteristic lines is corrected for different operating states (such as amount of sunlight, atmospheric humidity, air temperature or the like). The automatic characteristic lines to be corrected for this purpose are selected in the order of the ranking list from a plurality of automatically characteristic lines stored and ranked in the manner of a ranking list of stored automatic characteristic lines with different priorities depending on the prevailing operating states. In one aspect of the present invention, when a plurality of automatic characteristic lines is or has been selected for correction, the learning value thus determined is divided among the number of selected characteristic lines according to a law of allocation—in particular imaged in the form of a characteristic line.

To retain the continuity of each automatic characteristic line to be corrected, the learning and/or correction are preferably performed at all the interpolation points of the respective characteristic line.

The transition from manual operation of the air conditioning system which occurs in the manual procedure to automatic operation of the air conditioning system can be continuous. Therefore, a delay element in the form of a counter or the like is started, for example, after conclusion of the manual intervention so that complete manual operation prevails at the start of counting, first developing into an intermediate mixed operation which then changes into completely automatic operation in a process that is continuous with the counting operation of the counter. The delay element for implementation of the continuous transition can be designed so that with manual activation of the automatic function, the continuous transition can be terminated at any point in time, allowing an intermediate switch to completely automatic operation.

In addition to the inventive method for operating an air conditioning system, the present invention also includes an air conditioning system as such. This inventive air conditioning system can be operated in both manual operation and automatic operation, whereby in automatic operation, any automatic characteristic line can be corrected based on a manual adjustment procedure. The air conditioning system includes sensors for detecting operating state values (inside and outside the vehicle) representing an operating state and influencing the climate in the transportation means as well as having actuators such as fans or an air slat drive. Furthermore, memory means are provided, supplying a plurality of automatic characteristic lines for different operating states which represent the fixedly preselected dependent relationships between the operating state values detected and the respective manipulated variables for actuators of the air conditioning system duration operation. Finally, adjusting means are also provided for performing manual adjustment procedures, e.g., adjusting the fan speed or adjusting the direction of flow and the amount of air blown into the interior of the vehicle. According to the present invention, the air conditioning system also includes means for detecting a manual adjustment operation during operation of the air conditioning system, means for selecting an automatic characteristic line to be corrected for a certain operating state, means for determining the deviation in manipulated variable between the manipulated variable set on the basis of the manual adjustment process and the manipulated variable for automatic operation assigned to the operating state values prevailing at this point in time, means for determining a learning value by weighting the manipulated variable deviation thus determined with a weighting factor of less than one and means for weighting the learning value over a range of several interpolation points of the automatic characteristic line and means for adjusting the automatic characteristic line as a function of the learning value thus determined. All the means listed above can be implemented in the air conditioning control unit.

BRIEF DESCRIPTION OF THE DRAWINGS

The present invention is described in greater detail below with reference to the figures, in which.

DETAILED DESCRIPTION

Figure 1:
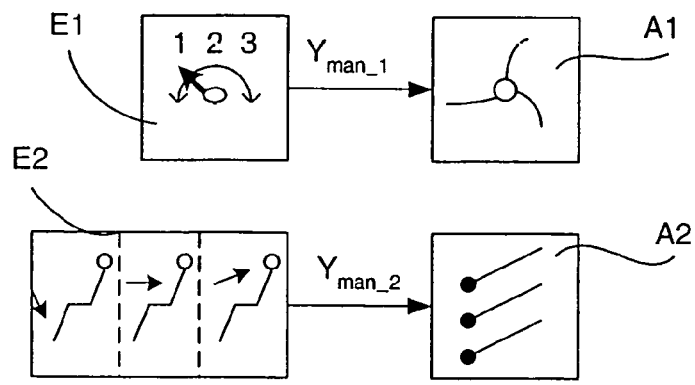
FIG. 1 shows a schematic diagram of one possible embodiment of a logic unit for operation of an air conditioning system.
Figure 1:
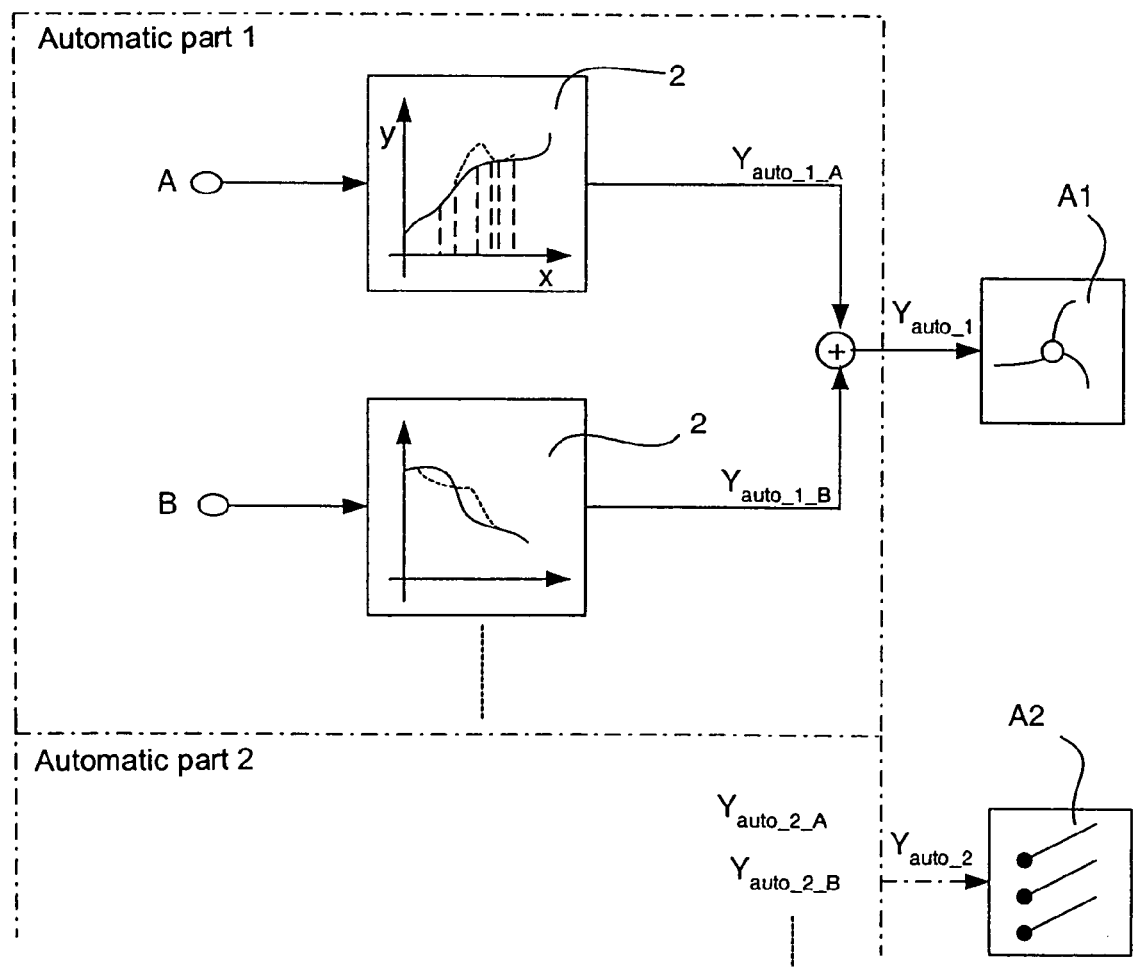

The top part of FIG. 1 shows a schematically simplified diagram of the manual part of an air conditioning system. For example, first adjusting mechanism E1 for preselecting the fan speed and second adjusting mechanism E2 for preselecting the air volume and the direction in which the air should flow into the vehicle are provided as manual adjusting mechanisms E1, E2. Manual manipulated variables $Y_{man\_1}$, $Y_{man\_2}$ are adjusted via adjusting mechanisms E1, E2; the actuators A1, A2 of the air conditioning system—such as the fan or air slat drive are triggered on the basis of these manipulated variables. According to this invention, changes detected in a manipulated variable $Y_{man\_1}$, $Y_{man\_2}$ occurring due to a manual adjusting operation act on the automatic part of the air conditioning system in such a way that the changes made and the operating state values X prevailing at the point in time of the changes made are detected and on the basis of these changes the characteristic line(s) stored in the memory means can be modified and only the modified automatic characteristic line(s) is (are) used for regulation when returning to automatic operation.

The bottom part of FIG. 1 shows in a simplified schematic diagram the automated part of an air conditioning system with automatic characteristic lines 2 for different operating states A, B. The influence of various operating states A, B on a single manipulated variable of an actuator A1—a fan in this case—is illustrated here in an automatic part 1. Each characteristic line field contains a characteristic line for exactly one operating state A, B. For example, the upper automatic characteristic line 2 represents the relationship between operating state values detected on the basis of incident sunlight (x axis) and the respective manipulated variable $Y_{auto\_1\_A}$ for the fan power (y axis), while the lower automatic characteristic line 2 represents the relationship between the operated state values detected on the basis of the atmospheric humidity and the interior of the vehicle (x axis) and the respective manipulated variable $Y_{auto\_1\_B}$ for the fan power (y axis). Since multiple operating states A, B are to influence the triggering of the fan here, the manipulated variables $Y_{auto\_1\_A}$, $Y_{auto\_1\_B}$ thus generated are combined to form a resulting manipulated variable $Y_{auto\_1}$. For the case when only a single operating state A, B is to influence the triggering of the actuator A1, the single manipulated variable $Y_{auto\_1\_A}$ that is generated would at the same time represent the resulting manipulated variable $Y_{auto\_1}$ for direct triggering of the actuator A1. The dotted line indicates that a plurality of other automatic characteristic lines 2 may be present for other operating states (such as air temperature (outside, inside), atmospheric humidity (outside), . . . ).

The control of an actuator A2 in the form of an air slat drive is illustrated in the automatic part 2. By analogy with the automatic part 1, the triggering of the air slat drive is indicated here by at least one, preferably a plurality of individual characteristic line fields. The manipulated variable $Y_{auto\_2}$ may likewise be formed from a plurality of manipulated variables $Y_{auto\_2\_A}$, $Y_{auto\_2\_B}$ of different characteristic line fields of different operating states or formed directly by a single manipulated variable $Y_{auto\_2\_A}$ of a single characteristic line field.

The perpendicular dotted lines between the X axis and the characteristic line in the automatic part 1 illustrates that each characteristic line has a plurality of so-called interpolation points. The values between the interpolation points are derived in particular by linear interpolation. To have the smoothest possible learning behavior, the distances between the neighboring interpolation point should be selected to be as small as possible. The characteristic line parts shown with small dotted lines of an automatic characteristic line 2 illustrate the partial areas of the corrected automatic characteristic line 2 corrected by means of the inventive method and/or the inventive air conditioning system. The corresponding partial areas together with the partial areas of the original automatic characteristic line 2 continuing at the end yield the total corrected automatic characteristic line 2 which, after making the correction, serves as a basis for additional regulating procedures—at least until the next learning process based on manual intervention measures during automatic operation.

Figure 2:
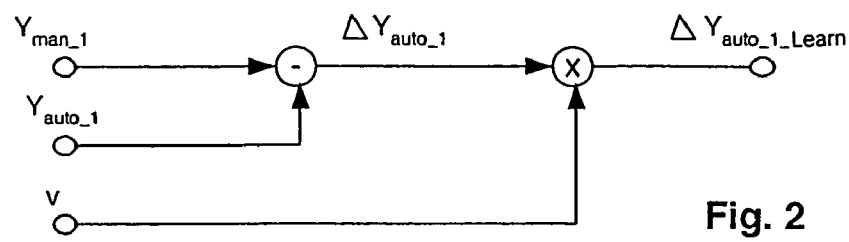
FIG. 2 shows an exemplary embodiment of a linking logic unit for determination of a learning value.

FIG. 2 illustrates an exemplary embodiment of a linking logic unit for determining a learning value $\Delta Y_{auto\_1\_learn}$. According to this invention, operation is monitored, preferably during the entire operation of the air conditioning system, to determine whether a manual intervention measure has occurred. If such an intervention measure has occurred, then the manipulated variable $Y_{man\_1}$ prevailing because of the manual intervention measure for the triggering of a final control element is compared with the manipulated variable $Y_{auto\_1}$ of automatic operation prevailing at the time of the intervention measure (e.g., compared by subtraction)—preferably only after a predetermined debouncing time has elapsed. The deviation $\Delta Y_{auto\_1}$ thus determined is multiplied by a weighting factor v according to this invention (a factor <1 in particular) and thus a learning value $\Delta Y_{auto\_1\_learn}$ is determined for correction of one or more automatic characteristic lines 2. With the help of the learning value $\Delta Y_{auto\_1\_learn}$, the current automatic characteristic line 2 is adjusted and replaced.

Figure 3:
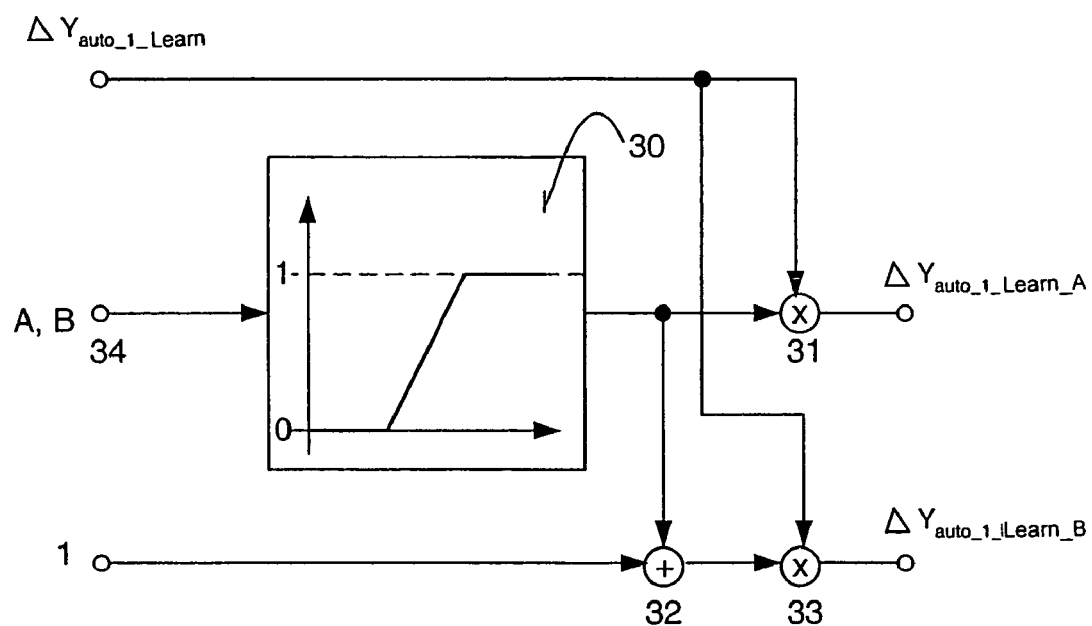
FIG. 3 shows an exemplary embodiment of a linking logic unit for dividing the learning value between two automatic characteristic lines to be corrected.

Depending on the overall operating state (all operating states and/or parameters occurring and detected), several automatic characteristic lines 2 may be active at the same time, so a special logic unit determines with which partial amount of the learning value $\Delta Y_{auto\_1\_learn}$ thus determined each of the automatic characteristic lines 2 is to be learned and/or corrected for a certain operating state A, B. Such a logic unit is depicted in FIG. 3 as an example of two automatic characteristic lines 2 that are active at the same time. This logic unit is notified of a significant operating state (e.g., outside temperature) and a portion of the learning value $\Delta Y_{auto\_1\_learn\_A}$, $\Delta Y_{auto\_1\_learn\_B}$ which is to be used for learning the selected automatic characteristic line 2 is determined by an allocation law which is provided, e.g., in the form of a characteristic line, to be used for learning the selected automatic characteristic line 2. The significant operating state A, B may also be one whose characteristic line is not being changed at the moment. The remainder of the learning value may be used for correction of the other automatic characteristic lines 2. The logic unit in the example depicted here comprises a characteristic line part 30 (illustration of an allocation law, e.g., in the form of a ramp function) and three linkage points 31, 32, 33. A significant operating state A, B is reported to the characteristic line part 30 via a first logic input 34. A proportional factor between zero and one is determined on the basis of the characteristic line part 30, yielding the learning value component $\Delta Y_{auto\_1\_learn\_A}$ for the first automatic characteristic line 2 of the priority list via the first linkage point 31 multiplied times the learning value $\Delta Y_{auto\_1\_learn}$. At the same time, the proportional factor is subtracted from the value one via the second linkage point 32 and this result is multiplied times the learning value $\Delta Y_{auto\_1\_learn}$ via the third linkage point 33 and a learning value component $\Delta Y_{auto\_1\_learn\_B}$ for second automatic characteristic line 2 of the priority list is obtained. Any number of other learning value components may also be determined for the automatic characteristic lines 2 that are to be corrected. Then however additional characteristic line parts 30 representing corresponding allocation laws would also have to be tied into the logic unit.

The automatic characteristic lines 2 that are active simultaneously and are to be corrected for the individual operating states A, B are stored in a certain order in a type of priority list as a function of the prevailing overall operating state. This priority list is preferably selected as an invariable list at the manufacturing plant.

An automatic characteristic line 2 has a plurality of interpolation points, as already indicated in FIG. 1. It is determined in general by linear interpolation between the two interpolation points closest to the particular input value. To retain the continuity of the automatic characteristic line 2 that is to be corrected, the learning can be performed at all interpolation points on the automatic characteristic line 2. According to this invention, learning is performed by weighted addition of the learning value $\Delta Y_{auto\_1\_learn}$ thus determined and/or the learning value component $\Delta Y_{auto\_1\_learn\_A}$, $\Delta Y_{auto\_1\_B}$ with the original value of the manipulated variable $Y_{auto\_1}$, $Y_{auto\_1\_A}$, $Y_{auto\_1\_B}$ for automatic operation. The weighting is selected so that the greatest learning occurs at the most active interpolation points and learning decreases with a distance from the active interpolation point. The basis for such a weighting may be a standardized (maximum value of the distribution=1) normal function (such as a Gaussian normal distribution). The normal distribution curve is to be tied in so that its vertex (mean value=1) is assigned to the current operating state value $X_{current}$ and the standard deviation $\Phi$ defines the desired learning width.

Figure 4:
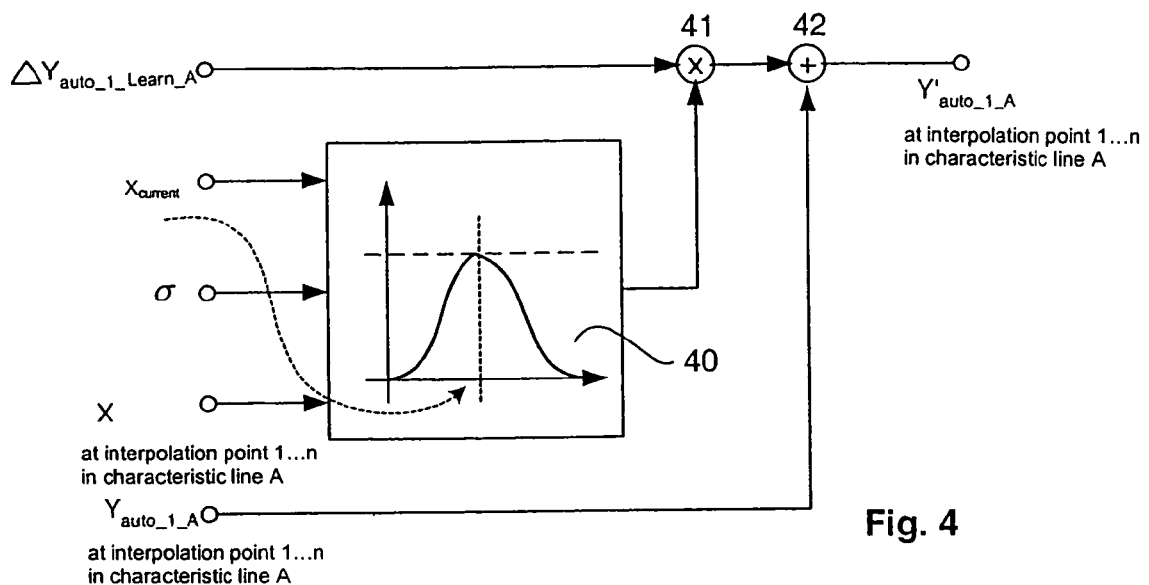
FIG. 4 shows an exemplary embodiment of a linking logic unit for weighting learning values for distribution among multiple interpolation points of the automatic characteristic line to be corrected.

FIG. 4 shows an exemplary embodiment of a linking logic unit for weighting learning values $\Delta Y_{auto\_1\_learn}$ and/or learning value components $\Delta Y_{auto\_1\_learn\_A}$ and thus for distribution among multiple interpolation points of the automatic characteristic line 2 to be corrected. This logic unit here includes a learning component 40 having the stored characteristic line of a normal distribution and two linkage points 41, 42. The current operating state value $X_{current}$, the desired learning width $\Phi$ and the operating state value X at the particular active interpolation point are sent to the learned component 40 at the input end. Each interpolation point is assigned a learning factor on the basis of the characteristic line of the learned component 40. By multiplying the learning value component $\Delta Y_{auto\_1\_learn\_A}$ determined previously and/or the learning value $\Delta Y_{auto\_1\_learn}$ times the learning factor in the first linkage point 41 and the subsequent addition with the original manipulated variable $\Delta Y_{auto\_1\_learn}$ at the active interpolation point in the second linkage point 42 the new corrected manipulated variable $Y'_{auto\_1\_A}$ is calculated for the corresponding interpolation point.

Figure 5:
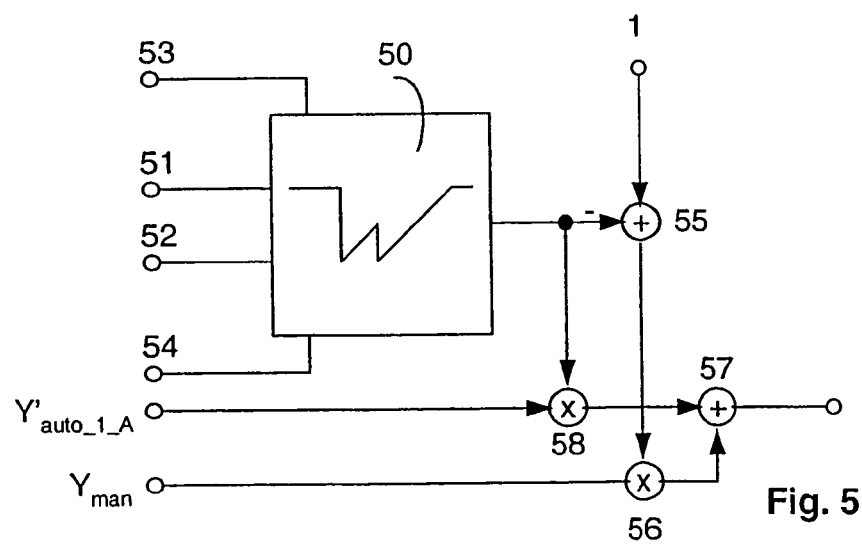
FIG. 5 shows an exemplary embodiment of a delay element for continuous transition from manual operation prevailing because of a manual intervention procedure to automatic operation.

To improve the comfort performance of the inventive air conditioning system, after manual operation occurring due to a manual intervention in the automatic operation, the automatic transition back to automatic operation is implemented continuously. To this end, a delay element according to FIG. 5 in the form of a counter 50 is preferably used. The counter 50 has at the input end inputs 51, 52 for specifying upper and lower limits and an input 53 for the start and an input 54 for manual immediate switching to automatic operation. In addition, the delay element includes four linkage points 55, 56, 57, 58. The counter 50 is started for continuous transition to automatic operation after the end of the manual adjusting procedure. This is accomplished for example by generating a start signal after a predefined dwell time following a manual intervention. If a new intervention is to occur during the counting operation, the counter is reset again and restarted again after the dwell time has elapsed. In this way a sliding transition (with mixed operation) from a starting value of the counter (completely manual operation) to an end value of the counter (completely automatic operation) is achieved. During the running time of the counter, a combination of automatic operation and manual operation is thus implemented, whereby the particular setting is accomplished by a combination of the corrected manipulated variable $Y'_{auto\_1}$ for automatic operation $Y'_{auto\_1}$ and the manipulated variable $Y_{man\_1}$ on the basis of the manual setting.

In the present example, the counter 50 is incremented from zero to one after the start. With each manual intervention during this period of time it is reset and restarted. During this counting period, the counter values are detected continuously and supplied at the counter output. These counter values are processed continuously by multiplying the particular current countervalue times the manipulated variable $Y'_{auto\_1}$ for the automatic setting at the linkage point 58 and this result is forwarded to the linkage point 57, where it is then added to the product (linkage point 56) from the manipulated variable $Y_{man\_1}$ of the manual setting and the result of the subtraction of 1 minus the current counter value is added to the instantaneous manipulated variable (linkage point 57).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for operating an air conditioning system that is operable both manually and automatically for a transportation means, whereby an automatic characteristic line is corrected based on a manual adjustment procedure, and whereby the air conditioning system comprises sensors for detecting operating state values influencing the climate in the transportation means and representing an operating state, actuators in the form of air conditioning system components, memory means having a plurality of automatic characteristic lines for different operating states which represent the fixedly predetermined dependencies between the operating state values detected and the manipulated variable components for actuators of the air conditioning system during automatic operation, and adjusting means for performing the manual adjusting operation and the issuance of manipulated variables for the actuators of the air conditioning system, the method comprising the acts of:

detecting presence of a manual adjustment operation, determining a manipulated variable deviation between the manipulated variable set on the basis of the manual adjustment operation and the manipulated variable assigned to automatic operation when the operating state values are the same, determining a learning value by weighting the manipulated variable deviation using a weighting factor, adjusting the automatic characteristic line as a function of the learning value by weighting each learning value a weighting function over a range of several interpolation points, and correcting the automatic characteristic line to be weighted as a function of the weighted learning value at each of the interpolation points.

2. Method as claimed in claim 1, wherein at least two automatic characteristic lines of different operating states are assigned to an actuator and a respective learning value is divided among multiple automatic characteristic lines by an allotment law in the form of a characteristic line.

3. Method as claimed in claim 1, wherein the weighting function is a normal distribution function.

4. Method as claimed in claim 1, wherein a vertex of the weighting function is situated in a current operating state value of the automatic characteristic line to be corrected.

5. Method as claimed in claim 1, wherein manual operation prevailing because of the manual adjustment operation is automatically and continuously converted to automatic operation after the end of the adjustment operation.

6. Method as claimed in claim 1, wherein each automatic characteristic line to be corrected is selected from a plurality of automatic characteristic lines that are prioritized differently as a function of prevailing operating states and each automatic characteristic line is selected in an order of prioritization.

7. Method as claimed in claim 1, wherein the manipulated variable deviation is determined via one of a plurality of individual values of manually adjusted manipulated variables with at least almost the same operating state values and manipulated variables assigned to these values are determined for automatic operation.

8. Air conditioning system for a transportation means, having a manual operation and an automatic operation, whereby each automatic characteristic line is correctable in automatic operation based on a manual adjustment process, the system comprising:

sensors for detecting operating state values that influence climate in the transportation means and represent an operating state;

actuators in the form of air conditioning system components;

memory means having a plurality of automatic characteristic lines for different operating states, representing fixedly predetermined dependencies between the operating state values detected and manipulated variables for actuators of the air conditioning system during automatic operation;

adjusting means for performing the manual adjustment procedure and preselecting manipulated variables for the actuators of the air conditioning system;

means for detecting a manual adjustment operation during operation of the air conditioning system;

means for selecting an automatic characteristic line to be corrected for a certain operating state;

means for determining manipulated variable deviation between a manipulated variable adjusted on the basis of the manual adjustment operation and a manipulated variable assigned to automatic operation at the same operating state value;

means for determining a learning value by weighting the manipulated variable deviation with a weighting factor; and means for adjusting the automatic characteristic line as a function of the learning value, so that each learning value is weighted with a weighting function over a range of several interpolation points and the automatic characteristic line to be corrected is corrected at each of the interpolation points as a function of the weighted learning value.

9. Air conditioning system as claimed in claim 8, further comprising:

means for allocating the learning value, whereby the learning value is allocatable by means of an allocation law in the form of a characteristic line, among several automatic characteristic lines.

10. Air conditioning system as claimed in claim 8, further comprising:

a counter for an automatic and continuous transition from manual operation due to the manual intervention to automatic operation.

11. Air conditioning system as claimed in claim 8, wherein the means for selecting an automatic characteristic line to be corrected is arranged so that each automatic characteristic line to be corrected is selectable from a plurality of automatic characteristic lines, whereby the automatic characteristic lines are prioritized differently as a function of the prevailing operating state values and the automatic characteristic line is selectable in the order of the prioritization.

12. Air conditioning system as claimed in claim 8, wherein the means for determining the manipulated variable deviation are designed so that the manipulated variable deviation is determinable via a manipulated variable set manually from a plurality of individual values with at least approximately the same operating state values and manipulated variables for automatic operation assigned to these values.

13. Method for operating an air conditioning system that is operable both manually and automatically for a transportation means, the method comprising the acts of:

detecting presence of a manual adjustment operation, determining a manipulated variable deviation between the manipulated variable set on the basis of the manual adjustment operation and the manipulated variable assigned to automatic operation when the operating state values are the same, determining a learning value by weighting the manipulated variable deviation using a weighting factor, adjusting the automatic characteristic line as a function of the learning value by weighting each learning value a weighting function over a range of several interpolation points, and correcting the automatic characteristic line to be weighted as a function of the weighted learning value at each of the interpolation points.

14. Method as claimed in claim 13, wherein at least two automatic characteristic lines of different operating states are assigned to an actuator and a respective learning value is divided among multiple automatic characteristic lines by an allotment law in the form of a characteristic line.

15. Method as claimed in claim 13, wherein the weighting function is a normal distribution function.

16. Method as claimed in claim 13, wherein a vertex of the weighting function is situated in a current operating state value of the automatic characteristic line to be corrected.

17. Method as claimed in claim 13, wherein manual operation prevailing because of the manual adjustment operation is automatically and continuously converted to automatic operation after the end of the adjustment operation.

18. Method as claimed in claim 13, wherein each automatic characteristic line to be corrected is selected from a plurality of automatic characteristic lines that are prioritized differently as a function of prevailing operating states and each automatic characteristic line is selected in an order of prioritization.

19. Method as claimed in claim 13, wherein the manipulated variable deviation is determined via one of a plurality of individual values of manually adjusted manipulated variables with at least almost the same operating state values and manipulated variables assigned to these values are determined for automatic operation.

* * * * *